United States Patent Office 3,748,324
Patented July 24, 1973

3,748,324
METHOD FOR THE PURIFICATION OF SUCROSE ESTERS OF FATTY ACIDS
Norio Mizutani, Ichiro Sasaki, Takamitsu Ito, and Hiroshi Ueno, Kyoto, Shoichi Nishizaki, Hikone, and Tetsuo Ishizuka, Kyoto, Japan, assignors to Dai-Ichi Kogyo Seiyaku Co., Ltd., Shimogyo-ku, Kyoto, Japan
No Drawing. Filed Feb. 5, 1970, Ser. No. 9,040
Claims priority, application Japan, Feb. 5, 1969, 44/8,598; Sept. 22, 1969, 44/75,652; Oct. 29, 1969, 44/87,078
Int. Cl. C07c 69/32
U.S. Cl. 260—234 R                                 9 Claims

ABSTRACT OF THE DISCLOSURE

The process for the purification of sucrose esters of fatty acids from crude reaction mixtures or the like compositions containing such sucrose esters comprises the steps of dissolving the crude reaction mixture or the like in a solution of the mixture of an organic solvent with water to form a system and removing impurities contained in said crude reaction mixture or the like dissolved in said solution by carrying out any one of the following treatments or their combinations:
 (a) adding to the system an acid or an acid salt in an amount necessary to acidify said system so as to have a pH value within the range of 3.5 to 5.0, whereby the sucrose ester is recovered by a liquid-liquid extraction operation;
 (b) adding to said system a salt of a metal whose valence is at least two to form double decomposition salts, and then removing said double decomposition salts to recover the sucrose ester; and
 (c) adding to said system a water soluble substance to recover the sucrose ester by precipitation.

---

This invention relates to a process for the purification of sucrose (or saccharose) esters of fatty acids, more particularly, to a process for the purification of sucrose esters of fatty acids (hereinafter referred to as SE) from crude reaction mixtures or the like compositions containing such sucrose esters.

In conventional processes for the production of sucrose esters of fatty acids on an industrial scale, dimethyl formaldehyde is used as solvent for carrying out a reaction between sucrose and a fatty acid. It is also known to use dimethyl sulfoxide, morpholine and pyridine as solvent for the production of SE. Belgian Pat. No. 696,700 granted to Osipow et al. discloses an improved process for the production of SE utilizing a transparent emulsion. This process is known as the "transparent emulsion process." Belgian Pat. No. 719,016 discloses another method for the directiosynthesis of crude sugar and esters of fatty acids in the presence of an alkaline catalyst. Further, in "Chemical Week" issued in the U.S.A. on Sept. 13, 1969, there is disclosed a process for the production of SE by carrying out a chemical reaction between sugar and fat or oil in molten state in the presence of a metallic soap. U.S. patent specification No. 3,347,848 discloses the production of SE in which two kinds of solvents are used in combination. Extensive as well as intensive researches have been made in the field of the SE production, since sucrose esters of fatty acids are highly appreciated among various food additives for their outstanding hydrophilic and emulsifying characteristics. Sucrose esters of fatty acids produced according to any of the above mentioned or other conventional methods inevitably contain some portion of impurities. In general, crude reaction products made by such processes include in their solid body about 10 to 80% of SE, about 2 to 50% of non-reacted sucrose, about 5 to 40% of anionic surface active agent, 1% or less of coloring and odor substances and other reaction residues. The most important problem to be solved is to remove various impurities contained in the crude reaction products in an economically as well as industrially acceptable manner.

The invention is directed to the purification of the crude SE reaction products and the like compositions obtained by various conventional methods. The like compositions described hereinabove indicate various SE containing compositions and solutions for industrial use.

SE containing crude reaction mixtures made by the so-called transparent emulsion method include in particular about 10 to 40% of anionic surface active agents hereinafter referred to as anionic surfactants. Since this portion of the anionic surfactant causes emulsification, none of the conventional processes for the purification of sucrose esters of fatty acids could be applicable to purify the crude reaction mixtures containing such anionic surfactant prepared by the transparent emulsifying method. Accordingly, a new effective purification process for such SE containing crude reaction mixture made by the transparent emulsion method has been desired. As disclosed in Japanese patent publication No. 13,102 of 1960, the crude reaction mixtures containing SE made by processes other than the transparent emulsion method generally comprise basic alkyl ester of fatty acid, sucrose ester of fatty acid formed by transesterification of natural or synthetic glycerides with sucrose, non-reacted sucrose, a small amount of soap-by-produced owing to the presence of catalyst, and other non-reacted substances.

While British patent specification No. 826,801 discloses a process for recovery of esters of sucrose from crude reaction mixtures containing such esters by using water and ketone solvent or ester solvent, this process can not be successfully applied to recover sucrose esters from the crude reaction mixtures prepared by the transparent emulsion method. As explained, this is due to the fact that the crude SE containing reaction mixtures made through the utilization of the transparent emulsion technique include among others a relatively large amount of anionic surfactant and this portion of the surfactant causes an undesirable emulsification which makes it difficult to separate the organic and water phases from each other if the recovery of sucrose esters from the crude mixtures is carried out by such process as disclosed in the above British patent. Even if the system could be separated into the two phases, the sucrose ester is transferred in large amounts into the water phase, thus lowering the extraction efficiency. Moreover, any recrystallization, if subsequently carried out, cannot successfully separate the sucrose ester from the anionic surfactant.

A few processes for the purification of sucrose esters from crude reaction mixtures containing such esters are revealed in such literatures as "JAOCS" vol. 44 published in 1967 (page 309) and "Sugar esters" by Noyes Development Corp. in 1968 (pages 11 and 12). The proposed processes comprise in general putting the crude reaction mixture containing the sucrose ester into a single methylethylketone solvent, precipitating out therefrom unesterified sucrose and a portion of soap by using a solid-liquid extraction technique, acidifying with acid sodium sulfate the extract containing the sucrose ester and residual soap, and recovering the sucrose ester from the system at a lowered temperature. While it had been suggested that the unesterified sucrose is totally removed from the system by solid-liquid extraction operation in the above procedures, we have found that unesterified sucrose remains in the system in an amount approximately equal to residual soap after such extraction. In addition, the salt produced due to the acidification of the extract remains unremoved. That is, according to the above mentioned processes in which a solid-liquid extraction operation is carried out using a hydrated organic solvent phase, unesterified sucrose and salt produced by the acidification always stay in the system and some is found in the yield of recovered sucrose ester. Acid sodium sulfate used during the acidification step is converted into sodium sulfate and an attempt of the removal of sodium sulfate will necesarily involve the removal of a certain amount of sucrose ester. In conclusion the proconventional process for the recovery of sucrose esters from SE containing crude reaction mixtures made by using the transparent emulsion method have many disadvantages. They are complicated in process construction as they require a solid-liquid extraction. They yield only a reduced amount of purified sucrose esters. Sucrose esters recovered by such processes include relatively large proportions of soap and unesterified sucrose which may result in poor purity thereof.

The method disclosed in Belgian patent specification No. 696,700 set forth above also utilizes a solid-liquid extraction technique and acidification of the extracted phase to a pH of 6. With this method it is impossible to remove entirely the unesterified sucrose and salt produced during the acidification as in the case with other method mentioned above.

The anionic surfactant exists not only in the crude reaction product for SE produced by the transparent emulsion method but also in any other like compositions containing SE which are produced by other methods or as a by-product of any other chemical process. Such anionic surfactants may be those added for carrying out the reaction or produced during such reaction. It is extremely difficult to separate such anionic surfactant from the crude reaction products or the like compositions containing the sucrose ester since the anionic surfactants and fatty acids exhibit substantially similar properties, in particular, solubility, to those of sucrose esters of fatty acid with respect to various solvents. Accordingly, a more efficient process for the separation of anionic surfactants has long been desired, especially in the food industry where sucrose esters of fatty acids having a possible minimum content of surfactants are needed.

The primary object of this invention is to provide a new and improved method for the purification of sucrose esters of fatty acids in which anionic surfactants can be particularly effectively removed from the crude reaction products or the like compositions containing such sucrose esters on an economically as well as industrially acceptable basis with a high yield of sucrose ester.

The SE content in the crude reaction products described above comprises monoester, di-ester and other esters higher than diester. Hereinafter esters higher than monoester will be referred to as "polyester." It is extremely difficult to produce crude reaction products substantially comprising the monoester alone. Nevertheless, the monoester is highly appreciated as a "epoch-making" surfactant and already there is a great demand for the monoester because of its superior hydrophilic characteristics as compared with conventional innoxious surface active agents such as, for example, fatty acid esters of glycerin, sorbitan and propylene glycol. To the inventors' knowledge there is no industrially acceptable process, at present, for the effective separation of monoesters in purest possible form from the crude reaction products described which comprise monoester, diester and other polyesters.

As disclosed in Japanese patent publication No. 6,165 of 1963, in a conventional process for separating SE from the phase of hydrated organic solvent containing such ester, the monoester is separated from polyesters by cooling the hydrated ketone phase containing SE or hydrated alcohol containing SE. This process is disadvantageous in that it is difficult to recover the monoester from the liquid layer and the recovered monoester is of lower purity. Japanese patent publications Nos. 6,852 and 26,250 of 1965 teach to separate and recover sucrose esters of fatty acids from SE containing ethyl acetate solution by first water-extracting sucrose from the etryl acetate solution, then transferring sucrose esters of fatty acids into a water layer, maintaining the ethyl acetate layer at lower temperatures and finally extracting the sucrose ester from the water layer with a mixed solution of cyclohexane and butanol. This process has the disadvantage that it is extremely complicated and costly.

Another object of the invention is to provide a new and improved method for effectively isolating the monoester from polyesters contained in the crude reaction products described.

A further objcet of the invention is to provide a new and useful method for the purification of sucrose esters of fatty acids in which different treatments for removing various impurities are combined successively according to the purposes for which the products are used.

The process for the purification of sucrose esters of fatty acids from crude reaction mixtures or the like compositions containing such sucrose esters comprises the steps of: dissolving the crude reaction mixture or the like in a solution of a mixture of an organic solvent with water to form a system and removing impurities contained in said crude reaction mixture or the like dissolved in said solution whereby the sucrose ester is recovered. The step of removing impurities comprises subjecting said crude reaction mixture or the like to any one of the following treatments or their combinations:

(a) Adding to the system an acid or an acid salt in an amount necessary to acidify said system so as to have a pH value within the range of 3.5 to 5.0, whereby the sucrose ester is recovered by a liquid-liquid extraction operation;

(b) Adding to said system a salt of a metal whose valence is at least two to form double decomposition salts, and then removing said double decomposition salts to recover the sucrose ester; and (c) Adding to said system a water soluble substance to recover the sucrose ester by precipitation.

The above mentioned treatment (a) has been found particularly advantageous for the recovery of sucrose esters of fatty acids from SE containing crude reaction mixtures prepared by using the transparent emulsion technique and including a relatively large amount of anionic surfactant. A preferred embodiment of the invention is carried out by adding 1 part of the crude reaction mixture containing the sucrose ester of fatty acid, unesterified sucrose, anionic surfactant and a small amount of catalyst to the mixed solution comprising 3 to 10 parts of an organic solvent and 2 to 8 parts of water, adjusting the pH of said mixed solution at a value within the range of 3.5 to 5.0 with the addition of an acid sufficient to acidify the anionic surfactant and stirring the mixed solution at elevated temperatures until the constituents thereof are completely dissolved. The amount of water set forth above includes the amount of water when acid is to be added in to the form of an aqueous solution.

The prepared system is allowed to separate into two distinct layers of water and organic solvent layers without causing emulsification. It would be more desirable to wash the separated water layer with 1 to 3 parts of a fresh amount of organic solvent and then to add the upper organic layer thereof to the initially separated organic solvent layer.

The proportion of water to organic solvent in the mixed solution and the amount of the mixed solution to be used are suitably selected depending on the content of each of sucrose ester of fatty acid, unesterified sucrose and anionic surfactant in the crude reaction mixture described and/or the number of carbon atoms of the fatty acid in the raw material for producing the crude reaction mixture described. However, it should be noted that an insufficient use of water may thwart ready liquid-liquid separation, while an excess amount of water may result in a decreased yield of purified sucrose esters of fatty acids.

It is also essential to keep the solution comprised of the crude reaction mixture, an organic solvent and water at a pH strickly within the range of 3.5 to 5.0 by adding an acid thereto in order to acidify the anionic surfactant. With the pH value of the solution less than 3.5 the sucrose ester of fatty acid in the solution tends to be decomposed, while with the pH over 5.0 the anionic surfactant may insufficiently or not at all be acidified with the result being the formation of an emulsion during the extraction.

According to the above mentioned process, substantially all of the sucrose ester of fatty acid and acidified surfactant are extracted into the separate upper layer of organic solvent, while substantially all of the unesterified sucrose and salt are extracted into the lower water layer.

A high yield of sucrose ester of fatty acid can be recovered by subjecting the upper organic solvent layer to a suitable drying treatment. In some applications it is possible, however, to use this layer of organic solvent without drying.

The process according to this aspect of the invention may be followed, if necessary, by concentration and filtration at lower temperatures of the remaining organic layer to recover more purified sucrose ester of fatty acid.

Moreover, according to this purpose, unlike conventional ones, substantially all of the water soluble substances are removed from the sucrose ester of fatty acid by means of the liquid-liquid extraction.

Compounds which are employed to acidify the surface active agent prior to the liquid-liquid extraction are chiefly acids which may include mineral acids such as hydrochloric acid, sulfuric acid, phosphoric acid and organic acids such as formic acid, acetic acid, lactic acid, malic acid and succinic acid. Acid salts such as acid sulfate and acid phosphate may also be used for this purpose.

Suitable solvents which may be used for the liquid-liquid extraction are methyl acetate, ethyl acetate, n-hexane, toluene, benzene, xylene, methyl ethyl ketone, methyl isobutyl ketone and the mixtures thereof. The mixture of water and one or more of these organic solvents provides a preferred system in which the water and solvent are isolated from each other into two distinct layers without producing an emulsion. This facilitates an efficient extraction of the sucrose ester of fatty acid.

If desired, suitable pre-treatments may be given to the crude reaction mixtures described before the present process is carried out. One such pre-treatment involves the removal of considerable amounts of anionic surfactant and unesterified sucrose from the crude reaction mixture by putting the crude reaction mixture into an organic solvent to cause a solid-liquid extraction of the system.

The extract obtained as the result of this pre-treatment could be used in the present process with or without removing the organic solvent therefrom.

The other of such pre-treatments involves the removal of a substantial amount of unesterified sucrose from the crude reaction mixture by carrying out a liquid-liquid extraction with the addition to the crude reaction mixture of water and an organic solvent the same as the one which will be used for the liquid-liquid extraction in the present process. In this pre-treatment a substantial amount of unesterified sucrose is extracted out of the crude mixture into the aqueous phase.

In case either of these pre-treatments is done, the same organic solvent as for the liquid-liquid extraction in the present process is preferably employed.

According to the invention, the anionic surfactant contained in the crude reaction products or the like compositions can be removed by the before-mentioned treatment (b) as well as by the treatment (a). The treatment (b) comprises adding to the system comprising a solution of the mixture of an organic solvent with water and crude reaction mixture or the like dissolved therein, a salt of a metal whose valence is at least two to form double decomposition salts and then removing the double decomposition salts to recover the sucrose ester.

It has been found that the anionic surfactant contained in the crude reaction products described or the like could substantially be separated and removed therefrom by double-decomposing the surfactant into double-decomposition salts such as metallic soaps by addition of a salt of a metal whose valence is at least two. This naturally results in a substantial increase of SE yields. The treatment (b) is particularly advantageous for the purification of the crude reaction products produced by the so-called transparent emulsion method, the products of which generally contain a greater amount of anionic surfactant.

Suitable metallic salts which may be used for the purpose of the treatment (b) are, for example, neutral, acidic and alkaline salts or complex salts or double salts of divalent or higher metals such as aluminum, barium, cobalt, lead, magnesium, manganese, copper, zinc, calcium, tin, silver and iron, or the mixtures of those salts. Among those salts there may be mentioned for example, aluminum hydroxide, barium hydroxide, calcium hydroxide, calcium chloride, magnesium chloride, magnesium sulfate, cupric chloride, cobalt chloride, zinc hydroxide, stannous chloride, calcium acetate, silver nitrate, bleaching powder and alums.

These metallic salts may be used in an amount stoichiometrically equivalent to the amount of the anionic surfactant to be removed or in a slight excess amount.

The proportion of organic solvent to water depends on the organic solvent utilized. Preferably, the water content of the system is less than 50%, as in treatments (a) and (c) described herein.

The solvents to be used are preferably those capable of completely dissolving the crude reaction product described. However, they may be those which are capable of dispersing the crude reaction product to such an extent that the reaction between the metallic salt and the anionic surfactant contained in the product may proceed without any substantial trouble. Such suitable solvents include, for example, water, methanol, ethanol, isopropanol, n-propanol, n-butanol, isobutanol, n-hexane, cyclohexane, benzene, toluene, chloroform, acetone, methyl ethyl ketone, methyl isobutyl ketone, dimethyl formamide, dimethyl sulfoxide, petroleum ether, diethyl ether, methyl acetate, ethyl acetate, propyl acetate, butyl acetate and the mixtures thereof. The amount of the solvent to be used may preferably be less than 50 times by weight of the SE solid.

When a metallic salt described is added to the crude reaction product, a double decomposition reaction occurs between the metallic salt and the anionic surfactant to form a metallic soap and a by-product salt. The metallic soap is a salt of a divalent or higher metal and the anionic portion of the anionic surfactant. For example, treatment of the crude product in methanol solution using a soap as an anionic surfactant and magnesium chloride as a metallic salt produces a double decomposition reaction as follows:

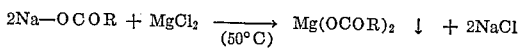

wherein R is the fatty acid residue.

Although Na-soap and magnesium chloride are soluble in methanol solution, the magnesium soap produced is not soluble in methanol and tends to be separated out from the reaction system whenever it is formed during the double decomposition. Thus, the double decomposition reaction continues until either Na-soap or magnesium chloride is totally expelled out of the reaction system.

The system after the completion of the double decomposition reaction comprises a sucrose ester of a fatty acid, a metallic salt of the surfactant formed by the double decomposition, a by-produced salt, the non-reacted metallic salt, non-reacted sucrose and others. The sucrose ester of fatty acid and the metallic salt of the anionic surfactant remain in the system substantially in the form of a solid-liquid phase with the sucrose ester of fatty acid being substantially in the form of a liquid layer and the metallic salt in a solid layer. Accordingly the sucrose ester of fatty acid and the metallic salt formed by the double decomposition of the surfactant are readily separated from each other by filtering the liquid-solid layers. In some cases SE and the metallic salt of the surfactant may remain in the system in the form of a liquid-liquid phase. For the separation of the liquid-liquid layers, centrifugation, decantation or any other conventional method may be utilized.

The layer containing SE which is stripped of the metallic salt of the surface active agent is further stripped of other substances by distillation of the solvent and drying to obtain a high yield of sucrose ester of fatty acid. The organic layer containing SE thus obtained may be industrially used for certain purposes without any further treatment.

The double decomposition reaction may be carried out at temperatures between 0 to 100° C., preferably at temperatures below 70° C., and at pH values between 6 to 10. A reaction at higher temperatures than 70° causes the thermal cracking of the sucrose ester of fatty acid. The optimum pH depends on the metallic salt used and the double decomposition products. Generally speaking, the lower the pH, the more preferable, but it must be higher than the pH value at which decomposition of the double decomposition salts is caused.

The before mentioned treatment (c) is an alternative method for effectively carrying out the purification of sucrose esters of fatty acids. We have found that a high yield of sucrose esters of fatty acids is economically obtained by substantially quantitatively precipitating sucrose esters of fatty acids together with an organic or inorganic material easily soluble in water. It is also entirely feasible in this treatment to isolate the monoester from polyesters contained in the hydrated organic solvent layer through the selection of suitable proportions of composition and temperatures for the treatment of the organic layer obtained. The treatment (c) is also advantageously applicable for the purification of the crude reaction products obtained by "the transparent emulsion method" and "the dimethyl-formamide method" mentioned before.

Suitable solvents for the treatment (c) are above all ketones and esters. Ketones suitable for this purpose include acetone, methyl ethyl ketone, methyl isobutyl ketone, methyl isoamyl ketone, methyl amyl ketone, diethyl ketone, ethyl-n-butyl ketone, ethyl amyl ketone, ethyl isoamyl ketone and others. Esters suitable for the purpose include methyl formate, ethyl formate, methyl acetate, ethyl acetate, isopropyl acetate, n-propyl acetate, isobutyl acetate, n-butyl acetate, amyl acetate, isoamyl acetate, methyl propionate, ethyl propionate and others.

Some of the above mentioned solvents are immiscible with water so that the mixture of any of such solvents and water will be separated into two layers. The other solvents are miscible with water so as to form aqueous solvent solutions at any mixing ratio. Either type of solvents may be used for the invention. The selection of type depends on the properties of the crude reaction mixtures to be treated.

The hydrated organic solvent may be used in an amount by weight between 1 and 20 times as much as the sucrose ester of fatty acid in solid form. An optimum amount of the hydrated organic solvent to be used in the treatment (c) depend on the properties of the solvent and the aliphatic groups of the sucrose esters of fatty acids.

The proportion of the organic solvent to water depends on the organic solvent to be employed. Usually the water content of the system which is used for the purpose of the invention is less than 50%. The temperature at which sucrose esters of fatty acids are dissolved in the system containing water and an organic solvent are between −20° and 100° C. depending on the solvent to be used and aliphatic groups of the sucrose esters of fatty acids.

It is preferred that the crude reaction mixture or the like to be treated is completely dissolved in the organic solvent, but the crude reaction mixture or the like may be dispersed in the organic solvent.

The precipitation of sucrose esters of fatty acids is caused by the addition of a suitable water soluble organic or inorganic material to the system including the crude reaction mixture or the like. Any sucrose ester of fatty acid is precipitated out from the system as a result of the formation of a highly concentrated SE aqueous solution which may be produced due to the fact that the added water soluble material absorbs water in the system to form an aqueous solution, into which the sucrose ester of fatty acid in the organic solvent phase is dissolved. The water soluble material may be added in the form of an aqueous solution. Accordingly, it is essential for the material added to the system for precipitation to be easily soluble in water. Suitable water soluble materials which may be used for this purpose are inorganic metallic and ammonium salts and saccharides.

Water soluble inorganic metallic and ammonium salts may preferably include, for example, potassium chloride, sodium chloride, calcium chloride, magnesium sulfate, magnesium chloride, sodium sulfate, sodium hydrogen-sulfate, sodium sulfite, sodium thiosulfate, zinc chloride, potassium nitrate, sodium phosphates, sodium polyphosphates, sodium acetate, potassium carbonate, sodium lactate, barium lactate, ammonium nitrate, ammonium sulfate and others. Suitable organic materials are saccharides such as sucrose, dextrose, levulose and others. The water soluble material may be added in an amount from 1 to 100% by weight of the sucrose esters of fatty acids contained in the system as based on a solid form thereof.

The simultaneous precipitation of the water soluble material and sucrose esters of fatty acids is preferably carried out under the temperature conditions between −20° and 60° C. when a total recovery of sucrose esters of fatty acids is intended. When it is desired to separate sucrose esters of fatty acids comprising the monoester and polyesters including diester and higher ones into monoester and polyesters, the simultaneous precipitation of the water soluble material and sucrose esters of fatty acids is preferably carried out at a temperature of between 50° to 100° C. It should, however, be understood that the above temperature conditions are given by way of examples without intending to limit the temperatures thereof. In fact, the precipitation of sucrose esters of fatty acids together with the water soluble solvent may be carried out at a temperature other than the above mentioned range and it depends on the solvent used and aliphatic groups of the sucrose ester of fatty acid. Sucrose esters of fatty acid having smaller numbers of substituted fatty acid groups are more capable of forming an aqueous solution. Thus, mono-, di-, and tri-esters are successively transferred into aqueous solutions in that order.

It is preferable to adjust the pH of the system including the crude reaction mixture or the like by adding an acid to the system before the treatment (c) is effected.

The precipitate obtained according to the treatment (c) means a SE concentrated aqueous solution and the appearance and form of the precipitate depends on the monoester content thereof and thet temperature at which the precipitation is carried out.

According to the treatment (c) it is possible to recover and purify the SE precipitate formed by the addition of water soluble substance in a substantially quantitative manner and also to selectively recover, if desired, the monoester isolated from the SE precipitates. With this treatment such oil soluble impurities as anionic surfactant and unreacted methylester can be removed to the utmost extent. In particular, odorous as well as substances subject to taste have been substantially removed.

Preferably, the precipitation product thus obtained is in turn dried to the final product but it may be utilized as it is for certain purposes without any further treatment.

The precipitate after the treatment (c) includes the water soluble substance which may be removed, desired, by an appropriate manner to obtain a purer sucrose ester product.

Although each of the treatments (a), (b) and (c) provides independently an excellent purification effect as described before and further shown in the example hereinafter, combinations of any two or three of then may bring about unexpectedly good results from an industrial point of view.

As has been already described, the treatment (a) is particularly effective for removing from crude reaction mixtures containing sucrose esters such water soluble materials as unesterified sucrose, coloring matters, odorous substances, inorganic salts and residual solvent. The treatment (b) is particularly effective for removing from the SE containing reaction mixtures unesterified sucrose and anionic surfactant, while the treatment (c) is particularly effective for removing therefrom such oil-soluble materials as acidified anionic surfactant, coloring matters, non-reacted methyl ester and residual solvent.

Accordingly, highly purified sucrose esters of fatty acids can be economically obtained on an industrial scale by selecting the most suitable combinations of these treatments depending on the composition of the SE crude reaction mixtures, the reaction used to form such mixtures, applications in which recovered sucrose esters of fatty acids to be used and impurities to be removed from the crude reaction mixtures. It is important to combine the treatments in such sequence that may best be suited for a given purpose.

The combinations of any two steps of the three treatments (a), (b) and (c) are made in six forms:

$$a+b; a+c; b+a; b+c; c+a; \text{ and } c+b$$

The respective merits of those combinations are set forth below and the same are applicable to the combinations of all the three treatments. In the following explanations, "the regulation of water content in the organic layer" means maintaining the water content in the organic layer within the specified range hereinabove discussed in the detailed descriptions taken in conjunction with each of the treatments (a), (b) and (c). A certain amount of water is normally introduced into the layer for this purpose. However, if the SE containing organic layer or precipitate obtained in the preceding treatment of the combined processes is found to include water in sufficient amounts, it is no longer necessary to add a further portion of water.

As to the combination of $(a)+(b)$, the regulation of the water content in the organic layer obtained in the treatment (a) is carried out prior to the step of adding a metal salt or its aqueous solution according to the treatment (b). And in accordance with this combined process oil-soluble materials such as acidified anionic surfactant, non-reacted methyl ester and the like which are left unremoved in the treatment (a) are completely taken out from the system to provide the sucrose ester of fatty acid in purest possible form.

With respect to the combination of $(a)+(c)$, the regulation of the water content in the organic layer obtained in the treatment (a) is carried out before the step of adding a suitable water-soluble substance to the organic layer according to the treatment (c). The organic solvent for use in the treatment (c) is perferably selected from ketones and esters, and accordingly the same solvent may suitably be employed in the treatment (a). If a different solvent has been used in the treatment (a), it is desired to remove that solvent completely from the system and a new different solvent may then be introduced. This combined process can take out such oil-soluble materials as acidified anionic surfactant, non-reacted methyl ester and others which could not be removed by the treatment (a) alone.

As to the combination of $(b)+(a)$ in this order, it may be said that the regulation of the water in the SE containing organic layer obtained in the rteatment (b) is carried out before the liquid-liquid extraction operation of the treatment (a). This combined process completely removes the traces of water-soluble impurities from the system which have not been taken out in Step (b).

In case of the combination of $(b)+(c)$, the regulation of the water content of the organic layer obtained by the treatment (b) is carried out before the step of adding a water soluble material to the organic layer according to the treatment (c). The same details and remarks on the selection of an organic solvent for use in the treatment (c) hereinabove discussed with respect to the combination of $(a)+(c)$ may directly be applied to the selection of an organic solvent for use in this combined process. In accordance with this combined process, traces of oil-soluble impurities left unremoved in the treatment (b) are totally removed by the treatment (c).

Concerning the combinations of $(c)+(a)$, the liquid-liquid extraction of the treatment (a) is applied to the precipitate obtained in the treatment (c). Before carrying out the treatment (a), a fresh organic solvent is added to the precipitate obtained by the treatment (c) to form a further organic system and the water content of the further system is regulated so as to be adapted for the treatment (a). The adjustment of the pH of the further organic system is no longer necessary because the anionic surfactant has already been removed in the treatment (c). This combined process can remove the water-soluble substance such as unesterified sucrose, any by-product salt and others which are left behind in the precipitation in treatment (c) to provide sucrose esters of fatty acids in purest possible form.

In the combination of $(c)+(b)$, a fresh organic solvent is added to the precipitate obtained by treatment (c) to form a further system and the water content of the further system is regulated so as to be adapted for the treatment (b) in which a metallic salt or its aqueous solution is added to this thus prepared further system.

This combined process can remove various water soluble substances contained in the precipitate obtained by the treatment (c) such as the water soluble material added in the treatment (c), non-reacted sucrose and any by-produced salt, whereby a further purified sucrose ester product is obtained.

The above basic combinations of three different treatments, when utilized with careful consideration to their merits and operational conditions, will recover an ample yield of purified sucrose esters of fatty acids from crude reaction mixture containing such esters because each treatment in the combinations could be used to its advantage. Among the combinations of the above mentioned three treatments, $(b)+(c)+(a)$, $(b)+(c)$ and $(c)+(a)$ would be especially practically important and advantageous as well as a single treatment of each of (a), (b) and (c). However, the other combinations and repetition of any treatment are also useful.

In a further preferred embodiment of the invention, the treatment (a) is further followed by the step of fractionating the organic layer containing the extracted sucrose ester and then subjecting the fractionated layer to a recrystallization treatment to recover a sucrose ester precipitate.

As has been explained hereinabove, according to the treatment (a), the system including the crude reaction mixture or the like is separated into an upper layer of the organic solvent and a lower aqueous layer by the liquid-liquid extraction operation and as the result of this operation substantially all of the sucrose ester of fatty acid and acidified surfactant are extracted into the upper solvent layer, while unesterified sucrose and any by-process according to this embodiment of the invention contemplates further to separate the sucrose ester of fatty acid from the acidified surfactant in the fractionated organic layer. It has been found that this process including recrystallization is particularly adapted for the purification of the crude reaction mixtures obtained by the transparent emulsion method and having a relatively large content of the anionic surfactant. The recrystallization is effected by cooling down the fractionated organic layer containing the extracted SE to a temperature within the range of 0° to 30° C. A fresh organic solvent may be added to the precipitate obtained by this recrystallization for a further recrystallization. This operation may further be repeated. The organic solvent may preferably be used in recrystallization in an amount of about 2 to 5 parts for each part of the solid extract which will be obtained thereby. The sucrose ester of fatty acid is separated from the acidified surfactant and precipitated out in the organic layer due to the fact that the solubility of the sucrose ester tends to be reduced a lower temperature conditions during the recrystallization operation. Subsequent to this recrystallization, only a small fraction, i.e. 2 to 30% of the total sucrose ester of fatty acid, stays as residual in the mother liquor, while the acidified surfactant contained in the recovered sucrose ester amounts to less than 3% thereof, which amount is substantially negligible. A recrystallization at a temperature below 0° C. tends to precipitate the acidified surfactant together with the desired sucrose ester and a recrystallization at a temperature above 30° C. leaves a relatively large amount of the sucrose ester in the mother liquor. Therefore, the recrystallization should preferably be carried out at a temperature within the range of 0° to 30° C. as set forth above. If the aliphatic group of the SE contained in the crude reaction mixture is of the unsaturated type, the recrystallization must be conducted at a still lower temperature in order to obtain a satisfactory separation of the desired sucrose ester of fatty acid. The solvent which may exist in the precipitated or recrystallized sucrose ester of fatty acid is removed therefrom by a suitable technique to recover the powdery sucrose ester of fatty acid in purest possible form. In some applications the recrystallized sucrose ester of fatty acid is used as it is without removing the solvent therefrom.

Suitable organic solvents which may be used in the crystallation stage of the present process are methyl ethyl ketone, methyl isobutyl ketone, methyl acetate, ethyl acetate, n-hexane, methanol, acetone and the mixtures thereof. The use of n-butanol should be avoided because it tends to keep the sucrose ester of fatty acid in a solution form even at a more reduced temperature. It is possible to use for the recrystallation a different organic solvent from that used for the liquid-liquid extraction, although it should preferably be avoided as it makes the process more complicated and is disadvantageous for the recovery of the solvents. Accordingly, the use of the same organic solvent both in the liquid-liquid extraction and in the recrystallization renders the entire process more simplified. Suitable solvents for use in both procedures are those in which the sucrose ester of fatty acid is readily dissolved at a liquid-liquid extraction temperature within the range of 40° to 80° C. and difficultly dissolved at a recrystallization temperature within the range of 0° to 30° C. Such solvents may include methyl ethyl ketone, methyl isobutyl ketone, methyl acetate, ethyl acetate, n-hexane and the mixtures thereof. Methyl ethyl ketone is particularly suitable for this purpose.

In order to show the effectiveness of the above mentioned organic solvents, some examples are given hereinbelow. One part of a SE containing crude reaction mixture comprised of 40% sucrose ester of stearic acid, 30% sodium stearate, 26% unesterified sucrose and 3% remainder was added to the solution of the mixture of 5 parts of an organic solvent with 3 parts of water, and then a liquid-liquid extraction was carried out on the solution at a pH within the range of 3.5 to 40. A recrystallation of the sucrose ester of fatty acid from the solution was then effected in the same organic solvent at a temperature of about 10° C.

Obtained results are shown in the table below.

| Organic solvent | Methyl ethyl ketone | Methyl isobutyl ketone | Ethyl acetate | n-Hexane |
|---|---|---|---|---|
| Liquid-liquid extraction rate (percent) | 99 | 97 | 82 | 97 |
| Recrystallization rate (percent) | 96 | 95 | 86 | 91 |
| Recovery rate of sucrose ester (percent) | 95 | 92 | 71 | 88 |
| Purity of sucrose ester (percent) | 82 | 81 | 76 | 81 |

As is clear from the above table, methyl isobutyl ketone, ethyl acetate and n-hexane are all satisfactory as the organic solvent to be used in the present process and particularly, methyl ethyl ketone is more superior both in liquid-liquid extraction rate and recrystallization rate.

The recrystallization is also useful for removing oil-soluble materials such as acidified surfactant from the crude reaction mixtures containing sucrose esters of fatty acids with the result being an increased yield of such esters in purest possible form.

When it is intended to carry out successively the liquid-liquid extraction of the treatment (a) and the recrystallization described in the above, any of the following pre-treatments may be performed. Considerable amounts of anionic surfactant and unesterified sucrose are initially removed from the SE containing crude reaction mixtures by introducing the mixture into an organic solvent of the same kind as that to be used for the liquid-liquid extraction in the main process and by extracting the sucrose ester of fatty acid from the system through a solid-liquid extraction technique. The obtained extract may be introduced into the main process with or without the removal of the solvent therefrom. If this pretreatment has been conducted on the crude reaction mixture, a single cycle of the recrystallization procedure in the main process is sufficient to recover the desired sucrose ester of fatty acid in a satisfactory pure form.

Another pre-treatment involves a removal of unesterified sucrose from the SE containing crude reaction mixture by adding water and an organic solvent for use in the liquid-liquid extraction of the present main process to the SE crude reaction mixture and by extracting the sucrose ester of fatty acid from the system through liquid-liquid extraction. In this pre-treatment a substantial amount of unesterified sucrose included in the crude reaction mixture is removed therefrom into the aqueous layer. The obtained extract may be introduced into the main process with or without the removal of the solvent therefrom.

For the simplification of the entire process, it is preferred to carry out the pre-treatment using an organic solvent of the same kind as that used in the main process.

As described before the present invention is generally applicable to the purification of the crude reaction mixtures of sucrose esters or the like compositions containing any anionic surfactants, whether they may be added for the production of the crude reaction mixtures or by-produced during the reaction operation for the production of the crude reaction mixtures. Among those anionic surfactants which are used as emulsifiers for esterification, there may be included sodium, potassium and ammonium salts of fatty acids having from 12 to 22 carbon atoms; sodium and potassium salts of aromatic carboxylic acids; and alkyl sulfonate, alkyl sulfate, alkyl phosphate and alkyl benzene sulfonate, each having an aliphatic alkyl group of from 12 to 22 carbon atoms.

It should be noted that according to the present invention fatty acids having from 12 to 22 carbon atoms can be removed as effectively as the above mentioned anionic surfactants.

Sucrose esters of fatty acids obtained according to the present invention are tasteless, odorless, and innoxious and have HB values with a wide range so that their versatile use as non-ionic surface active agents can be realized. Particularly, sucrose esters of fatty acids having residual radicals of fatty acids with 16 to 20 carbon atoms are useful as non-ionic surface active agents for the food additives.

The present invention is further illustrated in the following examples, in which parts and percent indicate by weight unless otherwise described.

EXAMPE 1

500 parts of methyl ethyl ketone and 350 parts of water were added to 100 parts of a crude reaction mixture comprised 42% sucrose ester of stearic acid, 25% unesterified sucrose, 30% sodium oleate and 3% other constituents. The mixture was stirred vigorously at a temperature of 55° C. The mixture was stirred vigorously at a temperature of 55° C.

Concentrated hydrochloric acid (37%) was added to the mixture in an amount sufficient to adjust the pH of the mixture at about 4.5. The mixture was then allowed to separate into two layers. The upper organic layer was found to have 42 parts of sucrose ester of stearic acid and 28 parts of acid dissolved therein, while the lower aqueous layer was found to contain 25 parts of unesterified sucrose and 6.7 parts of sodium chloride produced as the result of a reaction between hydrochloric acid and sodium oleate. After removing the lower aqueous layer from the system, the remaining upper organic layer was washed with 100 parts of hot water in order to take out traces of sucrose and sodium chloride. The solvent was then extracted out of the organic layer after which the remainder was dried under a reduced pressure to obtain 70 parts of solid mass. The solid mass contained 60% sucrose ester of stearic acid and 40% oleic acid. The yield of sucrose ester of stearic acid was as high as about 99.8%.

EXAMPLE 2

2000 parts of methyl ethyl ketone and 500 parts of water were added to 100 parts of a crude reaction mixture prepared by using the transparent emulsion technique, which reaction mixture comprised 41% sucrose ester of stearic acid, 26% unesterified sucrose, 30% potassium stearate and 3% other constituents. The mixture was stirred at an elevated temperature of 40° C. 10 parts of bleaching powder was introduced into the system to cause a reaction in the system at a pH value of 9.0. A precipitate was formed in the system as the result of this reaction. Subsequent to the removal of the solvent from the supernatant liquid, the system including the precipitate was dried under a reduced pressure to finally obtain 43.6 parts of a solid mass of sucrose ester of stearic acid. The yield and purity of the sucrose ester were 97.8% and 92.0%, respectively. The product contains 57.0% monoester.

EXAMPLE 3

500 parts of petroleum ether and 100 parts of water were mixed at a temperature of 30° C. with 100 parts of a SE containing mixture which comprised 40% sucrose ester of lauric acid, 32% unesterified sucrose, 25% sodium dodecylbenzenesulfonate and 3% others.

The obtained reaction system was adjusted so as to have a pH of 9.0 and an aqueous solution of zinc sulfate was added dropwise to this system with stirring until the precipitation was concluded.

Upon completion of the reaction, the solution was isolated by a centifugal separator into an upper layer of petroleum ether and a lower water layer containing the precipitate. After the removal of the lower layer, the upper layer was dried under a reduced pressure to finally obtain 38.4 parts of a slightly fluid, yellowish brown mass of sucrose ester of lauric acid. The yield of the sucrose ester was 93%. Further, the recovered sucrose ester had a purity 97% and contained 52% of monoester.

EXAMPLE 4A 300 parts of water was added as solvent to 100 parts of pulverized crude reaction mixture comprising 55% sucrose ester of oleic acid, 15% unesterified sucrose, 27% potassium oleate and 3% residual reaction substances. The mixture was stirred at a temperature of 60° C. 4.5 parts of magnesium chloride was then added to the mixture to cause a chemical reaction.

Upon the completion of the reaction, the precipitate produced as the result of the reaction was freed of water and thereafter dried to obtain 77.8 parts of a brown mass. This mass contained 70.2% sucrose ester of oleic acid, 19.1% unesterified sucrose, 8.1% potassium chloride and 2.6% remainder. The yield of sucrose ester of oleic acid was as high as 99.2%.

EXAMPLE 4B 70 parts of the solid mass obtained in Example 1 was added to 500 parts of methanol and the mixture was heated at about 50° C. 20 parts of powdered calcium hydroxide was then introduced into the mixture with vigorous stirring for about one hour. During this operation the mixture was maintained at a temperature of 50° C. The stirring was continued for another 30 minutes keeping the mixture at substantially the same temperature in order to complete the reaction. The precipitate produced as a result of the reaction was filtered out from the solvent layer under a reduced pressure and the mother liquor containing the sucrose ester was then freed of methanol to recover 41.1 parts of solid mass. This solid mass was found to contain 94.8% of sucrose ester. The yield was 92.7%.

Another mother liquor was prepared for carrying out a similar procedure and then cooled down to a temperature of 5° C. to cause precipitation. The formed precipitate was filtered out from the mother liquor at a reduced pressure and dried to obtain 38.8 parts of white powdery mass. This mass contained sucrose ester having a purity of 97.6%. The yield of sucrose ester was 90.3%.

EXAMPLE 5

500 parts of methyl isobutyl ketone and 350 parts of water were added to 100 parts of a crude reaction mixture prepared by the transparent emulsion method and comprised of 41% sucrose ester of fatty acid of hardened beef tallow, 26% unesterified sucrose, 30% potassium of fatty acid of beef tallow and 3% others. The mixture was stirred at a temperature of 70° C. The lower water layer was removed from the mixed solution using a separating funnel to obtain the upper organic solvent layer.

After taking out a half of the entire solvent, 20 parts of Glauber's salt was added to the remaining organic layer and the system was well stirred. The pH of the system was maintained at 4.0. The system was then cooled down to a temperature of 20° C. to cause a precipitation, and the precipitate obtained was filtered out from the system and dried under a reduced pressure to yield 55.6 parts of a solid mass.

This mass contained 59.7% sucrose ester of fatty acid of beef tallow and 36.0% Glauber's salt. The yield of sucrose ester was 81.0%.

EXAMPLE 6

1000 parts of hydrated methyl ethyl ketone having a water content of 13% was added to 100 parts of a composition comprised of 42% sucrose ester of stearic acid, 25% unesterified sucrose, 30% sodium oleate and 3% others. The mixture was heated at a temperature of 60° C. The pH of the system was adjusted at 4.0 with addition of hydrochloride. 10 parts of sodium chloride was further added to the system which was thereafter stirred at the same temperature to form a precipitate. The system was then separated into the precipitate A and filtrate B.

100 parts of methyl ethyl ketone and 100 parts of water were added to the precipitate A and this mixture was heated at a temperature of 60° C. to form a system. The system, when remaining still, separated into an upper organic solvent layer and a lower water layer. The lower water layer was run off and the remaining upper layer was stripped of the solvent and dried under a reduced pressure to obtain 24.2 parts of solid mass A'.

On the other hand, 10 parts of sodium chloride was added to the filtrate B. The system was cooled down to a temperature of 5° C. to produce precipitation. The precipitate was filtered out from the system and was subjected to treatments similar to those carried out on the precipitate A. Upon the completion of the treatments 17.8 parts of solid mass B' was obtained.

The solid mass A' contained the sucrose ester of stearic acid having a purity of 99.2% and this sucrose ester included 86.2% of monoester, while the solid mass B' contained sucrose ester of stearic acid having a purity of 97.1% with 24.9% monoester content.

This example shows clearly that a sucrose ester of greater monoester content could be obtained by the addition of suitable water-soluble compounds and by suitably adjusting the temperature conditions.

EXAMPLE 7

1000 parts of ethyl acetate and 300 parts of water were added to 100 parts of a crude reaction mixture prepared by the dimethyl-formamide method and stripped of dimethyl formamide. The crude reaction mixture comprised 46.5% sucrose ester of fatty acid of hardened beef tallow, 43.8% unesterified sucrose, 2.1% non-reacted methyl ester, 5.6% fatty acid potassium salt of hardened beef tallow fatty acid and 2% others. The mixture was stirred at a temperature of 70° C.

After adjusting the pH of the system at 5, the water layer was removed from the system to leave the upper organic solvent layer. 14 parts of barium lactate was added to the organic layer and the system was then stirred at the same temperature condition for 30 to 60 minutes to finally form a pasty substance containing sucrose ester.

Subsequent to the removal of supernatant liquid, another 100 parts of isobutanol and 100 parts of water were added to the system and heated at the temperature of 60° C. The system was adjusted to have a pH of 7.0.

The lower water layer was run off and the upper organic solvent layer was first stripped of the solvent content and then dried under a reduced pressures to obtain 45.9 parts of solid mass.

This solid mass contained the sucrose ester of fatty acid of hardened beef tallow having a purity ester of fatty acid of hardened beef tallow having a purity of 98.5% and a monoester content of 54.0%. The yield was 97.2%.

EXAMPLE 8

200 parts of methyl ethyl ketone and 200 parts of water were added to the organic layer obtained in Example 1. 4 parts of anhydrous calcium chloride was further added to the mixture keeping it at a temperature of 55° C. The pH of the system was adjusted from 4.5 to 6.0 by the gradual addition of caustic soda. After 30 minutes stirring the precipitate was filtered out from the system and the remaining filtrate was allowed to separate into an upper organic solvent layer and a lower water layer. Subsequent to the removal of water, the organic layer was subjected to a drying treatment to obtain 42.8 parts of solid mass containing the sucrose ester of stearic acid. The recovered sucrose ester had a purity of 97.5% and the yield thereof was 97.5%.

EXAMPLE 9

10 parts of Glauber's salt was added to the remaining organic solvent layer obtained in Example 8. Thereafter, similar procedures to those in Example 5 were carried out to finally obtain 51.5 parts of solid mass.

The recovered solid mass contained 77.6% sucrose ester of stearic acid and 19.4% Glauber's salt. The yield of the sucrose ester was 95.2%.

EXAMPLE 10

10 parts of sodium chloride was added to the organic layer obtained in Example 1 keeping the layer at the same temperature as in Example 1. The mixture was vigorously stirred.

The system was then kept at a temperature of 0° C. for 30 minutes to cause precipitation. The precipitate was filtered and then dried to obtain 52 parts of solid mass.

This mass was found to contain 78.9% sucrose ester of stearic acid and 19.2% sodium chloride. The yield of the sucrose ester was 97.7%.

EXAMPLE 11

200 parts of ethyl acetate and 200 parts of water was introduced into the precipitate obtained by the addition of sodium chloride in Example 10. The mixture was heated at a temperature of 65° C. 2.0 parts of a 5% aqueous solution of calcium chloride was added to the system with stirring while keeping the system at a pH value of 8.0 by the addition of caustic soda. Upon the completion of the reaction, the precipitate and water layer were removed from the system and the remaining organic solvent layer was of the solvent.

The layer was further dried under a reduced pressure to obtain 39.8 parts of solid mass.

This mass contained sucrose ester of stearic acid having a purity of 99.2%. The yield of the sucrose ester was 94.0%.

EXAMPLE 12

500 parts of hexane and 300 parts of water were added to 100 parts of pulverized crude reaction mixture prepared by the transparent emulsion method and comprising 55% sucrose ester of fatty acid of beef tallow, 15% unesterified sucrose, 27% potassium oleate and 3% others. The mixture was heated at a temperature of 40° C. with stirring. While maintaining the reaction system at a pH of 7.5, an acqueous solution of zinc sulfate was added dropwise to the system until precipitation was halted. Upon the completion of the desired reaction, the system was separated by means of a centrifugal separator into an upper hexane layer and a lower water layer containing the precipitate. After the removal of the water layer, 300 parts of water was further added to the remaining hexane layer at a temperature of 60° C.

The system was adjusted to a pH of 4.0 by the addition of diluted hydrochloric acid and then allowed to separate into organic and water layers for 30 minutes. The water layer was run off and the organic layer was washed with 500 parts of hot water.

After removing the contained solvent, the organic layer was subjected to a drying treatment to finally obtain 53.5 parts of a solid mass. This solid mass contained the sucrose ester of fatty acid of beef tallow having a purity of 98.7%. The yield thereof was 98.7%.

EXAMPLE 13

500 parts of ethyl acetate and 50 parts of water were added to 53.5 parts of solid mass obtained in Example 12. The mixture was heated to a temperature of 60° C. with stirring. After adjusting the pH of the system at 3.0 with diluted hyrochloric acid, 10 parts of sodium chloride was further introduced into the system. A continued stirring of the system precipitated a pasty substance A. The pasty substance A was recovered from the system and 5 parts of sodium chloride was added to the supernatant. The new system was heated with stirring and then cooled down to a temperature of 10° C. to recover a precipitate B.

After the removal of the contained solvents, both the pasty substance A and the precipitate B were subjected to a drying treatment to obtain 49.5 parts of solid mass A' and 15.5 parts of solid mass B' respectively.

The solid mass A' contained 79.0% sucrose ester of fatty acid of beef tallow and 20.2% sodium chloride, while solid mass B' contained 67.5% sucrose ester of fatty acid of beef tallow and 32.2% sodium chloride. The sucrose ester in the recovered mass B' included 68% monoester and 32% di-and tri-esters.

EXAMPLE 14

100 parts of ethyl acetate and 500 parts of water were added to 100 parts of a crude reaction product prepared by the transparent emulsion method which comprised 53.0% sucrose ester of fatty acid of solid beef tallow, 26.0% unesterified sucrose, 17.0% sodium salt of hardened beef tallow fatty acid and 4% other reaction residues. The mixture was heated at a temperature of 55° C. with stirring while keeping the pH of the system at 0.5 with caustic soda. Aqueous solution of ferric chloride was introduced dropwise into the system until the formation of a precipitate was completely halted. Upon the completion of the desired reaction the organic solvent layer was separated from the system in a centrifigal separator. 16 parts of acid sodium phosphate was added to the organic layer and the new system was stirred at a temperature of 55° C. for 30 minutes. The system was then cooled down to a temperature of 10° C. with stirring and the resulting precipitate was filtered therefrom under a reduced pressure.

The precipitate thus obtained was further subjected to a drying treatment under a reduced pressure to recover 69 parts of a solid mass. This mass contained 74.6% sucrose ester of hardened fatty acid of beef tallow, 23.2% phosphate and 2.2% others. The yield of the sucrose ester was 97.2%.

EXAMPLE 15

200 parts of ethyl acetate and 200 parts of water was added to the precipitate obtained in Example 14 and the mixture was stirred at a temperature of 55° C. The system thus formed was adjusted to a pH of 4.5 by the gradual introduction of diluted hydrochloric acid. The system was, when kept still, immediately separated into an upper organic solvent layer and a lower water layer. After the water layer was run off the system, the remaining organic solvent layer was washed with 200 parts of hot water. After removing the water, the washed organic layer was cooled down to a temperature of 10° C. to cause precipitation. The recovered precipitate was then subjected to a drying treatment to obtain 50.8 parts of white powdery mass.

The powder contained the sucrose ester of fatty acid having a purity of 99%. The yield of the sucrose ester was 95%.

EXAMPLE 16

1000 parts of methyl isobutyl ketone and 1000 parts of water were added to the precipitate obtained by the addition of Glauber's salt in Example 5. The mixture was stirred at a temperature of 50° C. While continuing the stirring at substantially the same temperature, the system thus prepared was adjusted to a pH of 4.0 with the gradual introduction of diluted hydrochloric acid. The system, when kept still in a separation funnel, was separated into an upper organic layer and a lower water layer. After removing the water layer from the system, the remaining orgainic layer was subjected to a drying treatment to obtain 35.5 parts of solid mass.

This mass contained the sucrose ester of fatty acid having a purity of 90.7%. The yield of the sucrose ester was 78.5%.

EXAMPLE 17

2000 parts of methyl isobutyl ketone and 1200 parts of water were added to 33.5 parts of the solid mass obtained in Example 16. The mixture was stirred at a temperature of 50° C. While keeping the system thus prepared at a pH of 8.0, 1.0 part of calcium hydroxide was gradually introduced thereinto to cause the desired reaction.

Upon the completion of the reaction, the system was isolated in a separating funnel into an upper organic solvent layer and a lower water layer. The water layer was first taken out and then the solvent was removed from the remaining organic layer. Thereafter the organic layer was subjected to a drying treatment to obtain 32.6 parts of solid mass.

The recovered mass contained the sucrose ester of fatty acid having a purity of 98.2%. The yield was 78.0%.

EXAMPLE 18

300 parts of cyclohexane and 200 parts of water were added to the precipitate obtained in Example 5 as the result of the addition of Glauber's salt. The mixture was stirred at a temperature of 55° C.

While maintaining the system thus obtained at a pH of 9.0 with caustic soda, an aqueous solution of ferric chloride was gradually introduced into the system until the formation of precipitate was halted.

The system separated into an upper organic solvent layer and a lower water layer, when kept still, upon the conclusion of the desired reaction. The remaining organic layer was stripped of the solvent and then subjected to a drying treatment under a reduced pressure to obtain 34.4 parts of a solid mass.

This mass was found to contain the sucrose ester of fatty acid having a purity of 94%. The yield was 79%.

EXAMPLE 19

Water was introduced into the organic layer separated by the addition of the an aqueous solution of ferric chloride in Example 18. The mixture was heated to a temperature of 50° C.

The system thus prepared was adjusted to a pH of 4.0 by the addition of phosphoric acid and kept still so as to separate into an organic solvent layer and a water layer. After the removal of the water layer, the remaining organic layer was stripped of the solvent and then subjected to a drying treatment to obtain 32.6 parts of solid mass.

This solid mass contained the sucrose ester of fatty acid having a purity of 98%. The yield was 78%.

EXAMPLE 20

The organic layer obtained in Example 1 was cooled down to a temperature of 10° C. to cause precipitation. The precipitate thus formed was recovered by filtration technique and thereafter subjected to a drying treatment to obtain 44 parts of solid mass.

This mass contained the sucrose ester of stearic acid having a purity of 85.7%. The yield was 89.8%. The recovered sucrose ester comprised 55.0% monoester and 45.0% di- and tri-esters.

EXAMPLE 21

500 parts of n-hexane and 500 parts of water were added to 100 parts of the same crude reaction product as in Example 1. The mixture was heated to a temperature of 50° C. The system thus prepared was first adjusted to a pH of 4.0 with the introduction of 98% phosphoric acid and then kept still to be separated into an organic solvent layer and a water layer. After the removal of the water layer, the organic layer containing hexane was subjected to a recrystallization at a temperature of 10° C. 100 parts of methyl ethyl ketone was added to the precipitate recovered by the recrystallization. The new system was again subjected to a recrystallization treatment to cause precipitation. The recovered precipitate was dried under a reduced pressure to obtain 37.0 parts of white powder.

This powder contained the sucrose ester of stearic acid having a purity of 95.0% and a monoester content of 55.0%. The yield was 86.0%.

What is claimed is:

1. A process for the purification of a sucrose ester of a fatty acid from a crude composition containing 10–80% by weight of such sucrose ester and 10–40% by weight of one or a mixture of anionic surface active agents selected from the group consisting of sodium, potassium and ammonium salts of fatty acids having 12–22 carbon atoms, sodium and potassium salts of aromatic carboxylic acids, alkyl sulfonates having 12–22 carbon atoms, alkyl sulfates having 12–22 carbon atoms, alkyl phosphates having 12–22 carbon atoms and alkyl benzene sulfonates having 12–22 carbon atoms, both calculated on solids content, comprising dissolving the crude composition in a solution of a mixture of water and an organic solvent to form a system and removing impurities originally contained in the crude composition by one or a combination of the following treatments:

(a) adding to the system an acid selected from the group consisting of mineral acids, formic acid, acetic acid, lactic acid, malic acid and succinic acid or an acid salt selected from the group consisting of acid sulfates and acid phosphates in an amount sufficient to acidify the system to a pH of 3.5 to 5.0, whereby the sucrose ester is recovered by a liquid-liquid extraction operation, the organic solvent for this treatment being selected from the group consisting of methyl acetate, ethyl acetate, n-hexane, toluene, benzene, xylene, methyl ethyl ketone, methyl isobutyl ketone and mixtures thereof, (b) adding to the system a salt of a metal whose valence is at least two to form double decomposition salts and removing the double decomposition salts to recover the sucrose ester, the organic solvent for this treatment being selected from the group consisting of methanol, ethanol, isopropanol, n-propanol, n-butanol, isobutanol, n-hexane, cyclohexane, benzene, toluene, chloroform, acetone, methyl ethyl ketone, methyl isobutyl ketone, dimethyl sulfoxide, petroleum ether, diethyl ether, methyl acetate, ethyl acetate, propyl acetate, butyl acetate and mixtures thereof.

(c) adding to the system a water soluble substance selected from the group consisting of potassium chloride, sodium chloride, calcium chloride, magnesium sulfate, magnesium chloride, sodium sulfate, sodium hydrogensulfate, sodium sulfite, sodium thiosulfate, zinc chloride, potassium nitrate, sodium phosphates, sodium polyphosphates, sodium acetate, potassium carbonate, sodium lactate, barium lactate, ammonium nitrate and ammonium sulfate to recover the sucrose ester by precipitation, the organic solvent for this treatment being selected from the group consisting of acetone, methyl ethyl ketone, methyl isobutyl ketone, methyl isoamyl ketone, methyl amyl ketone, diethyl ketone, ethyl n-butyl ketone, ethyl amyl ketone, ethyl isoamyl ketone, methyl formate, ethyl formate, methyl acetate, ethyl acetate, isopropyl acetate, n-propyl acetate, isobutyl acetate, n-butyl acetate, amyl acetate, isoamyl acetate, methyl propionate and ethyl propionate.

2. The process according to claim 1, wherein the impurities are removed by dissolving the crude composition in a solution of a mixture of 3–10 parts of the organic solvent with 2–8 parts of water to form a system, adding to the system the acid or acid salt in an amount sufficient to acidify the system to a pH of 3.5 to 5.0 and recovering the sucrose ester by a liquid-liquid extraction operation, whereby the sucrose ester and the acidified surfactant are extracted into a separate layer of the organic solvent and any unesterified sucrose and other water soluble substances are extracted in a separate water layer, without causing emulsification between the two separate layers.

3. The process according to claim 1, wherein the impurities are removed by dissolving the crude composition in the solution mixture in an amount less than 50 times the weight of the sucrose ester solids to form a system, adding to the system the salt of a metal whose valence is at least two to form double decomposition salts, one of which is a salt of the anionic surface active agent, the amount of metallic salt being at least the stoichiometric equivalent of the anionic surface active agent, with the sucrose ester being dissolved in a liquid layer and the double decomposition salts being formed as insoluble components, and removing the double decomposition salts to recover the sucrose ester.

4. The process according to claim 1, wherein the impurities are removed by dissolving the crude composition in 1–20 times the weight of the sucrose ester solids of the solution mixture to form a system containing less than 50% water, and adding to the system the water soluble substance to recover the sucrose ester by precipitation, the amount of water soluble substances being 1–100% by weight of the sucrose ester solids.

5. The process according to claim 1, wherein the crude composition comprises about 10–80% sucrose ester, about 2–50% non-reacted sucrose, about 10–40% anionic surface active agent and 1% or less coloring and odor substances.

6. A process for the purification of a sucrose ester of a fatty acid from a crude composition containing 10–80% by weight of such sucrose ester and 10–40% by weight of one or a mixture of anionic surface active agents selected from the group consisting of sodium, potassium and ammonium salts of fatty acids having 12–22 carbon atoms, sodium and potassium salts of aromatic carboxylic acids, alkyl sulfonates having 12–22 carbon atoms, alkyl sulfates having 12–22 carbon atoms, alkyl phosphates having 12–22 carbon atoms and alkyl benzene sulfonates having 12–22 carbon atoms, both calculated on solids content, comprising dissolving the crude composition in a solution of a mixture of water and an organic solvent selected from the group consisting of methyl acetate, ethyl acetate, n-hexane, toluene, benzene, xylene, methyl ethyl ketone, methyl isobutyl ketone and mixtures thereof, to form a system, adding to the system an acid selected from the group consisting of mineral acids, formic acid, acetic acid, lactic acid, malic acid and succinic acid or an acid salt selected from the group consisting of acid sulfates and acid phosphates in an amount sufficient to acidify the system to a pH of 3.5 to 5.0, whereby the sucrose ester is recovered in the form of an organic layer separated from a water layer by a liquid-liquid extraction operation, regulating the water content of the organic layer containing the extracted sucrose ester, adding to the organic layer a salt of a metal whose valence is at least two to form double decomposition salts and removing the double decomposition salts to recover the sucrose ester.

7. A process for the purification of a sucrose ester of a fatty acid from a crude composition containing 10–80% by weight of such sucrose ester and 10–40% by weight of one or a mixture of anionic surface active agents selected from the group consisting of sodium, potassium and ammonium salts of fatty acids having 12–22 carbon atoms, sodium and potassium salts of aromatic carboxylic acids, alkyl sulfonates having 12–22 carbon atoms, alkyl sulfates having 12–22 carbons atoms, alkyl phosphates having 12–22 carbon atoms and alkyl benzene sulfonates having 12–22 carbon atoms, both calculated on solids content, comprising dissolving the crude composition in a solution of a mixture of water and an organic solvent selected from the group consisting of methyl acetate, ethyl acetate, n-hexane, toluene, benzene, xylene, methyl ethyl ketone, methyl isobutyl ketone and mixtures thereof, to form a system, adding to the system an acid selected from the group consisting of mineral acids, formic acid, acetic acid, lactic acid, malic acid and succinic acid or an acid salt selected from the group consisting of acid sulfates and acid phosphates in an amount sufficient to acidify the system to a pH of 3.5 to 5.0, whereby the sucrose ester is recovered in the form of an organic layer separated from a water layer by a liquid-liquid extraction operation, regulating the water content of the organic layer containing the extracted sucrose ester and adding to the organic layer a water soluble substance selected from the group consisting of potassium chloride, sodium chloride, calcium chloride, magnesium sulfate, magnesium chloride, sodium sulfate, sodium hydrogensulfate, sodium sulfite, sodium thiosulfate, zinc chloride, potassium nitrate, sodium phosphates, sodium polyphosphates, sodium acetate, potassium carbonate, sodium lactate, barium lactate, ammonium nitrate and ammonium sulfate to recover the sucrose ester by precipitation.

8. The process according to claim 7, wherein after recovering the sucrose ester by precipitation an organic solvent selected from the group consisting of methanol, ethanol, isopropanol, n-propanol, n-butanol, isobutanol, n-hexane, cyclohexane, benzene, toluene, chloroform, acetone, methyl ethyl ketone, methyl isobutyl ketone, dimethyl sulfoxide, petroleum ether, diethyl ether, methyl acetate, ethyl acetate, propyl acetate, butyl acetate and mixtures thereof, is added to the sucrose ester precipitate, the water content of the resultant system is regulated, a salt of a metal whose valence is at least two is added to said system to form double decomposition salts, and the double decomposition salts are removed from the system to recover the sucrose ester.

9. A process for the purification of a sucrose ester of a fatty acid from a crude composition containing 10–80% by weight of such sucrose ester and 10–40% by weight of one or a mixture of anionic surface active agents selected from the group consisting of sodium, potassium and ammonium salts of fatty acids having 12–22 carbon atoms, sodium and potassium salts of aromatic carboxylic acids, alkyl sulfonates having 12–22 carbon atoms, alkyl sulfates having 12–22 carbon atoms, alkyl phosphates having 12–22 carbon atoms and alkyl benzene sulfonates having 12–22 carbon atoms, both calculated on solids content, comprising dissolving the crude composition in a solution of a mixture of water and an organic solvent selected from the group consisting of methanol, ethanol, isopropanol, n-propanol, n-butanol, isobutanol, n-hexane, cyclohexane, benzene, toluene, chloroform, acetone, methyl ethyl ketone, methyl isobutyl ketone, dimethyl sulfoxide, petroleum ether, diethyl ether, methyl acetate, ethyl acetate, propyl acetate, butyl acetate and mixtures thereof, to form a system, adding to the system a salt of a metal whose valence is at least two to form double decomposition salts, removing the double decomposition salts to recover the sucrose ester, regulating the water content of the remaining system containing the extracted sucrose ester, adding to said system a water soluble substance selected from the group consisting of potassium chloride, sodium chloride, calcium chloride, magnesium sulfate, magnesium chloride, sodium sulfate, sodium hydrogensulfate, sodium sulfite, sodium thiosulfate, zinc chloride, potassium nitrate, sodium phosphates, sodium polyphosphates, sodium acetate, potassium carbonate, sodium lactate, barium lactate, ammonium nitrate and ammonium sulfate to recover the sucrose ester by precipitation, adding an organic solvent selected from the group consisting of methyl acetate, ethyl acetate, n-hexane, toluene, benzene, xylene, methyl ethyl ketone, methyl isobutyl ketone and mixtures thereof, to the recovered precipitate to form a second system, regulating the water content of the second system and adding to said system an acid selected from the group consisting of mineral acids, formic acid, acetic acid, lactic acid, malic acid and succinic acid or an acid salt selected from the group consisting of acid sulfates and acid phosphates in an amount sufficient to acidify the system to a pH of 3.5 to 5.0, whereby the sucrose ester is recovered in the form an organic layer separated from a water layer by a liquid-liquid extraction operation.

References Cited
UNITED STATES PATENTS

| | | | |
|---|---|---|---|
| 2,893,990 | 7/1959 | Hass et al. | 260—234 R |
| 2,948,717 | 8/1960 | Babayan et al. | 260—234 R |
| 3,141,012 | 7/1964 | O'Boyle | 260—234 R |
| 3,141,013 | 7/1964 | O'Boyle | 260—234 R |
| 3,249,600 | 5/1966 | Nobile et al. | 260—234 R |
| 3,378,544 | 4/1968 | O'Boyle | 260—234 R |

LEWIS GOTTS, Primary Examiner

J. R. BROWN, Assistant Examiner